United States Patent
Nakano

(10) Patent No.: US 10,151,431 B2
(45) Date of Patent: Dec. 11, 2018

(54) LIGHTING APPARATUS WITH LENS HAVING SAFETY LIGHT-DISPERSING STRUCTURES

(71) Applicant: PANASONIC INTELLECTUAL PROPERTY MANAGEMENT CO., LTD., Osaka (JP)

(72) Inventor: Yoshiyuki Nakano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 15/294,938

(22) Filed: Oct. 17, 2016

(65) Prior Publication Data
US 2017/0108182 A1 Apr. 20, 2017

(30) Foreign Application Priority Data

Oct. 20, 2015 (JP) .................................. 2015-206795
Jun. 27, 2016 (JP) .................................. 2016-126776

(51) Int. Cl.
*F21K 9/64* (2016.01)
*F21S 8/04* (2006.01)
(Continued)

(52) U.S. Cl.
CPC .................. *F21K 9/64* (2016.08); *F21S 8/04* (2013.01); *F21V 3/049* (2013.01); *F21V 5/04* (2013.01);
(Continued)

(58) Field of Classification Search
CPC .. G02B 5/1866; G02B 6/0006; G02B 6/0008; F21V 7/0091; F21V 5/04; F21V 5/045;
(Continued)

(56) References Cited

U.S. PATENT DOCUMENTS 6,987,613 B2 * 1/2006 Pocius ..................... G02B 5/32
257/98
7,118,931 B2 * 10/2006 Roberts ................ B60Q 1/2665
257/E23.044

(Continued)

FOREIGN PATENT DOCUMENTS

JP 2011-154995 8/2011

OTHER PUBLICATIONS

U.S. Appl. No. 15/292,743 to Yoshiyuki Nakano, filed Oct. 13, 2016.

*Primary Examiner* — Anh Mai
*Assistant Examiner* — Arman B Fallahkhair
(74) *Attorney, Agent, or Firm* — Greenblum & Bernstein, P.L.C.

(57) ABSTRACT

A lighting apparatus having laser light as a light source is provided. The lighting apparatus includes: a light-emitter which radiates light of a wavelength different from a wavelength of the laser light; and a lens including a light distribution controlling structure that controls distribution of the light radiated from the light-emitter. The lens is disposed opposite a laser light entry side of the lighting apparatus. The light-emitter is disposed between the lens and the laser light entry side. The lens integrally includes, along an optical axis of the laser light, a light-dispersing structure configured to disperse the laser light.

15 Claims, 14 Drawing Sheets

(51) Int. Cl.
*F21V 3/04* (2018.01)
*F21V 5/04* (2006.01)
*F21V 7/00* (2006.01)
*F21V 8/00* (2006.01)
F21Y 115/30 (2016.01)
F21W 131/405 (2006.01)
G02B 5/18 (2006.01)

(52) U.S. Cl.
CPC .......... *F21V 7/0091* (2013.01); *G02B 6/0006* (2013.01); *G02B 6/0008* (2013.01); *F21W 2131/405* (2013.01); *F21Y 2115/30* (2016.08); *G02B 5/1866* (2013.01)

(58) Field of Classification Search
CPC ... F21V 3/049; F21S 8/04; F21K 9/64; F21W 2131/405
See application file for complete search history.

(56) References Cited

U.S. PATENT DOCUMENTS

| | | | | |
|---|---|---|---|---|
| 7,251,084 B2* | 7/2007 | Shimura | ............... | F21V 5/045 359/742 |
| 7,336,244 B2* | 2/2008 | Suyama | ............ | G02B 27/2271 345/6 |
| 7,352,011 B2* | 4/2008 | Smits | ................ | H01L 33/54 257/100 |
| 7,618,161 B2* | 11/2009 | Morino | ................ | F21V 5/045 359/742 |
| 7,648,256 B2* | 1/2010 | Shiratsuchi | ............. | F21V 5/007 359/622 |
| 7,780,317 B2* | 8/2010 | Schroll | .................... | F21K 9/00 362/308 |
| 7,800,840 B2* | 9/2010 | Shyu | ...................... | F21V 5/045 359/742 |
| 8,033,691 B2* | 10/2011 | Bierhuizen | ............... | F21V 5/04 362/311.01 |
| 8,042,975 B2* | 10/2011 | Shyu | ........................ | G02B 3/08 359/742 |
| 8,163,580 B2* | 4/2012 | Daschner | ........... | H01L 25/0753 257/88 |
| 8,178,892 B2* | 5/2012 | Huang | .................. | H01L 33/20 257/99 |
| 8,269,202 B2* | 9/2012 | Backes | ................ | B60S 1/0837 250/216 |
| 8,956,010 B2* | 2/2015 | Huang | .................... | F21V 5/007 257/100 |
| 9,316,852 B2* | 4/2016 | Wang He | ................ | G02F 1/133 |
| 2005/0286145 A1* | 12/2005 | Silhengst | ................ | F21V 5/045 359/742 |
| 2006/0044806 A1* | 3/2006 | Abramov | ................ | F21V 5/007 362/337 |
| 2011/0157865 A1* | 6/2011 | Takahashi | ............. | F21S 48/115 362/84 |
| 2014/0078717 A1 | 3/2014 | Takahashi et al. | | |
| 2014/0204592 A1* | 7/2014 | Miyashita | ............. | F21S 48/115 362/311.06 |

* cited by examiner

LIGHTING APPARATUS WITH LENS HAVING SAFETY LIGHT-DISPERSING STRUCTURES

CROSS REFERENCE TO RELATED APPLICATIONS

This application claims the benefit of priority of Japanese Patent Application Number 2015-206795 filed on Oct. 20, 2015 and Japanese Patent Application Number 2016-126776 filed on Jun. 27, 2016, the entire contents of which are hereby incorporated by reference.

BACKGROUND

1. Technical Field

The present invention relates to a lighting apparatus having laser light as a light source.

2. Description of the Related Art

Conventionally, there are lighting apparatuses which include a light-emitting component containing phosphors that emit light with laser light transmitted by an optical fiber as excitation light, and illuminate by converting the laser light into light of a desired color. Since the laser light to be used as excitation light has a high energy density, there is a need for a technique for preventing the laser light from directly entering the eyes of a person even in the case where the light-emitting component falls off.

For example, Japanese Unexamined Patent Application No. 2011-154995 (Patent Literature 1) describes a technique in which a light-dispersing material containing minute particles of silicon oxide or titanium oxide in a dispersed manner is placed on a side of the light-emitting component which is opposite to the side that is irradiated with laser light, to reduce the coherence of the laser light in the event that the light-emitting component cracks or falls off, etc.

SUMMARY

However, in the case where the light-dispersing material is attached to the light-emitting component as in the conventional technique, the light-dispersing material would also fall off together with the falling off of the light-emitting component, and thus the light-dispersing material does not function as an emergency backup. Furthermore, in the case where the light-dispersing material is attached to another place, the light-dispersing material may fall off ahead of the light-emitting component and thus be unable to perform its function.

In view of this, the present disclosure provides a lighting apparatus capable of enhancing safety for human eyes while being a lighting apparatus having laser light as a light source.

A lighting apparatus according to an aspect of the present disclosure is a lighting apparatus having laser light as a light source, and includes: a light-emitting component which, by being irradiated with the laser light, radiates light of a wavelength different from a wavelength of the laser light; and a lens having a light distribution controlling structure that controls distribution of the light radiated from the light-emitting component, the lens being disposed opposite a laser light entry side of the lighting apparatus, with the light-emitting component disposed in between, wherein the lens integrally includes, in a portion through which an optical axis of the laser light passes, a light-dispersing structure that disperses the laser light.

According to the lighting apparatus according to an aspect of the present disclosure, the light-dispersing structure which disperses the laser light is provided integrally in the lens which is a comparatively large structure, and thus the possibility of the light-dispersing structure falling off from the optical axis of the laser light can be reduced and the safety of the lighting apparatus can be enhanced.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, a lighting apparatus according to exemplary embodiments of the present disclosure will be described using the drawings. It should be noted that each of the subsequently-described embodiments shows a specific example. Therefore, numerical values, shapes, materials, structural components, the arrangement and connection of the structural components, etc. shown in the following exemplary embodiments are mere examples, and are not intended to limit the scope of the present disclosure. Furthermore, among the structural components in the following exemplary embodiments, components not recited in any one of the independent claims which indicate the broadest concepts of the present disclosure are described as arbitrary structural components.

Furthermore, the respective figures are schematic diagrams and are not necessarily precise illustrations. In addition, in the respective diagrams, identical structural components are given the same reference signs.

Embodiment

Figure 1:
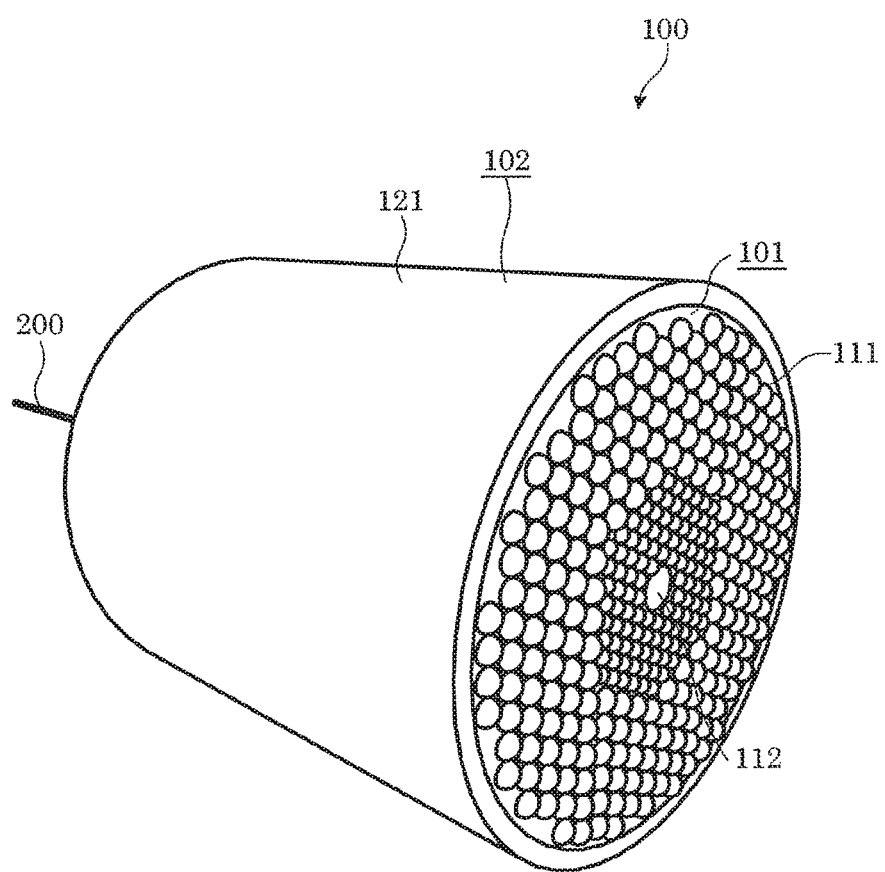
FIG. 1 is a perspective view of the external appearance of a lighting apparatus according to an embodiment.
Figure 2:
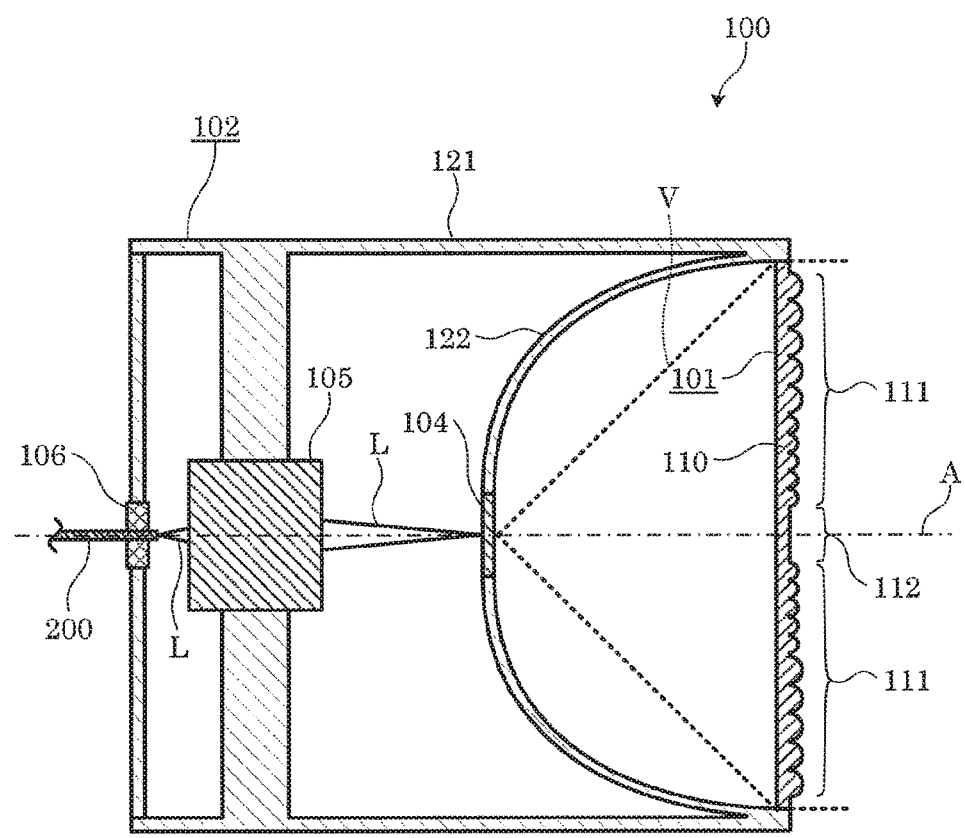
FIG. 2 is a cross-sectional view of the lighting apparatus according to the embodiment.

An embodiment is described below.
[Configuration of Lighting Apparatus]
FIG. 1 is a perspective view illustrating an external appearance of a lighting apparatus.
FIG. 2 is a cross-sectional view of the lighting apparatus.
As illustrated in these figures, lighting apparatus 100 is an apparatus that emits visible light, with laser light L as a light source, and includes light-emitting component 104 and lens 101. Furthermore, in this embodiment, lighting apparatus 100 includes case 102, optical system 105, and fiber attachment component 106.

As illustrated in FIG. 2, light-emitting component 104, by being irradiated with laser light L, radiates light of a different wavelength from laser light L. light-emitting component 104, for example, includes, in a dispersed state, phosphor particles which generate fluorescence when excited by laser light L, and irradiation with laser light L causes the phosphors to generate fluorescence that is of a different wavelength from laser light L. Specifically, light-emitting component 104 can be exemplified as a component in which phosphor particles are dispersed inside a transparent resin or glass base material, or a component in which phosphor particles are packed tightly together. In other words, light-emitting component 104 can be referred to as a wavelength conversion component which converts laser light into fluorescence.

In this embodiment, light-emitting component 104 radiates white light, and includes, in the appropriate ratio, three types of phosphors, namely, a first phosphor that emits red light, a second phosphor that emits blue light, and a third phosphor that emits green light, when irradiated with laser light L.

Although there is no particular limitation on the type or characteristics of the phosphors, the phosphor has, for example, high heat resistance since laser light L, which has a comparatively high output, serves as the excitation light.

Furthermore, although there is no particular limitation on the type of the material holding the phosphors in the dispersed state, the material has, for example, high transparency since higher transparency enhances radiation efficiency of white light. Furthermore, the material has, for example, high heat resistance since laser light L, which has comparatively high output, is incident thereon.

Furthermore, light-emitting component 104 may include a function film for efficiently irradiating the phosphors with laser light L, a function film for efficiently radiating emitted visible light, etc.

Lens 101 is a component disposed, with respect to light-emitting component 104, on a side opposite to the side that is irradiated with laser light L (in this embodiment, the side on which optical system 105 is disposed). Lens 101 includes light distribution controlling structure 111 which controls the light distribution of the light (visible light V) radiated from light-emitting component 104. Lens 101 integrally includes, in and about a portion through which optical axis A of laser light L passes, light-dispersing structure 112 which is a structure that disperses laser light L. It should be noted that since light-dispersing structure 112 is a small structure compared to light distribution controlling structure 111, light-dispersing structure 112 is not illustrated in detail in FIG. 1 and FIG. 2.

Although there is no particular limitation on the material of lens 101, as long as visible light V radiated from light-emitting component 104 is transmitted, a material, for example, enables light distribution controlling structure 111 and light-dispersing structure 112 to be formed integrally. A resin material such as acrylic or polycarbonate or a glass material, etc. can be given as examples of a material of lens 101.

Furthermore, lens 101 is, along with case 102, a comparatively large component in lighting apparatus 100, and is a component that is larger than at least light-emitting component 104. Furthermore, lens 101 is disposed at a position that is visible from the outside of lighting apparatus 100. Therefore, it is easily noticeable if lens 101 falls off from lighting apparatus 100, and it is also easily noticeable if lens 101 is chipped or cracked.

Furthermore, lens 101 is a comparatively large component and thus can be rigidly attached to case 102, which enables the possibility of lens 101 falling off from case 102 to be reduced as much as possible.

Figure 3:
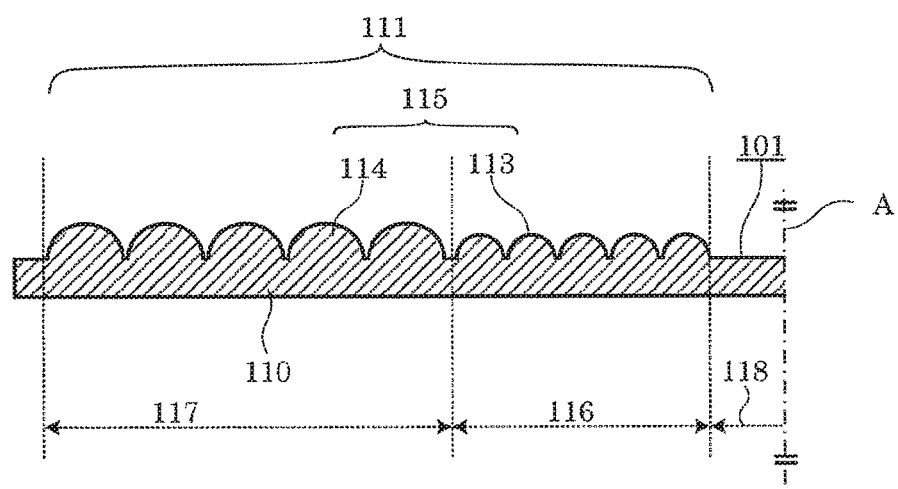
FIG. 3 is a cross-sectional view of a light distribution controlling structure of a lens according to the embodiment.

FIG. 3 is a cross-sectional view of the light distribution controlling structure of the lens.

As illustrated in the figure, light distribution controlling structure 111 is a component for mixing the colors of the visible light spreading in a radial direction from light-emitting component 104, and forming light having the desired spreading for lighting apparatus 100 (including parallel light), and has a structure in which a plurality of structural units 115 are aligned on a face that crosses (including orthogonal to) optical axis A. Here, structural units 115 are one of the elements that make up light distribution controlling structure 111. Furthermore, in this embodiment, structural units 115 included in light distribution controlling structure 111 have mutually identical shapes or similar shapes.

In this embodiment, light distribution controlling structure 111 includes first structural units 113 in refracting region 116 which is a region close to optical axis A, and includes second structural units 114 in reflecting region 117 which is a region that is farther from optical axis A than refracting region 116 is.

Refracting region 116 is a region in which first structural units 113 disposed therein control light distribution by mainly refracting visible light V radiated from light-emitting component 104.

Reflecting region 117 is a region in which second structural units 114 disposed therein control light distribution by mainly reflecting (including total internal reflection) visible light V radiated from light-emitting component 104.

It should be noted that the area of first structural units 113, that is, the area of lens 101 occupied by first structural units 113 when first structural units 113 are seen along the direction of optical axis A, or what is called the plan view area, is smaller than the area of second structural units 114. Accordingly, light distribution can be effectively controlled, and visible light V emitted from lens 101 can be made into substantially parallel light.

Furthermore, in this embodiment, structural units 115 are semispherical structures integrally projecting from a disc-shaped base portion 110. It should be noted that there is no particular limitation on the shape of structural units 115, and an arbitrary shape may be adopted. For example, the shape of structural units 115 may be recessed from the surface of base portion 110, and may be a combination of concave and convex shapes. Furthermore, an arbitrary shape, such as conical, triangular, quadrangular pyramidal, may be adopted as the shape of structural units 115. Furthermore, light distribution controlling structure 111 may be configured with a mix of structural units 115 having different shapes.

Figure 4:
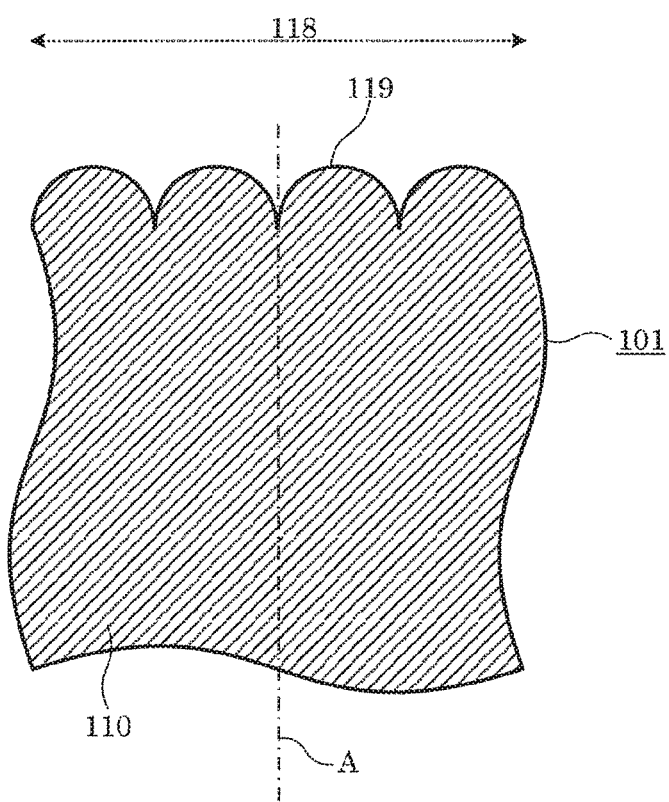
FIG. 4 is a cross-sectional view of a light dispersing structure of the lens according to the embodiment.

FIG. 4 is a cross-sectional view of the light-dispersing structure of the lens.

Light-dispersing structure 112 is a component for improving the safety of lighting apparatus 100 by dispersing coherent laser light reaching lens 101 to a degree that has no impact on human eyes, in the case where light-emitting component 104 cracks or falls off from case 102, etc. As illustrated in the figure, light-dispersing structure 112 has a configuration in which structural units are aligned on a face which crosses (including orthogonal to) optical axis A and which optical axis A passes through. Here, the region in which light-dispersing structure 112 is disposed is described as dispersion region 118, and the structural units disposed in dispersion region 118 are described as third structural units 119.

Light-dispersing structure 112 can be exemplified as a structure in which third structural units 119 are periodically arranged to form a diffraction grating, or as a structure in which third structural units 119 are non-periodically (randomly) arranged. Furthermore, the distance between adjacent third structural units 119 is in the order of microns in both the periodic structure and non-periodic structure. Accordingly, laser light L which has a shorter wavelength than visible light V radiated from light-emitting component 104 can be dispersed up to a degree that has no impact on human eyes.

Specifically, the distance between adjacent third structural units 119 of light-dispersing structure 112 is less than or equal to 1/100th of the distance between adjacent first structural units 113 or the distance between adjacent second structural units 114 of light distribution controlling structure 111. Furthermore, when light-dispersing structure 112 has a periodic structure, the distance (pitch) between adjacent third structural units 119 is, for example, less than or equal to 50 microns. Furthermore, when light-dispersing structure 112 has a non-periodic structure, the distance between adjacent third structural units 119 is less than or equal to 500 microns at most, and preferably at least 1 micron and at most 100 microns on average.

The shape of third structural units 119 is not particularly limited, a three-dimensional shape including a spherical surface or a surface based on a polynomial curve, a concave shape or a convex shape such as a triangular prism, a quadrangular prism, a trigonal pyramid, or a polygonal pyramid can be given as examples. Furthermore, all third structural units 119 need not have the same shape, and may have mutually different shapes.

In this embodiment, third structural units 119 has a semispherical shape integrally projecting from disc-shaped base portion 110, and are provided on the same face of base portion 110 as the face from which first structural units 113 and second structural units 114 project.

Figure 14:
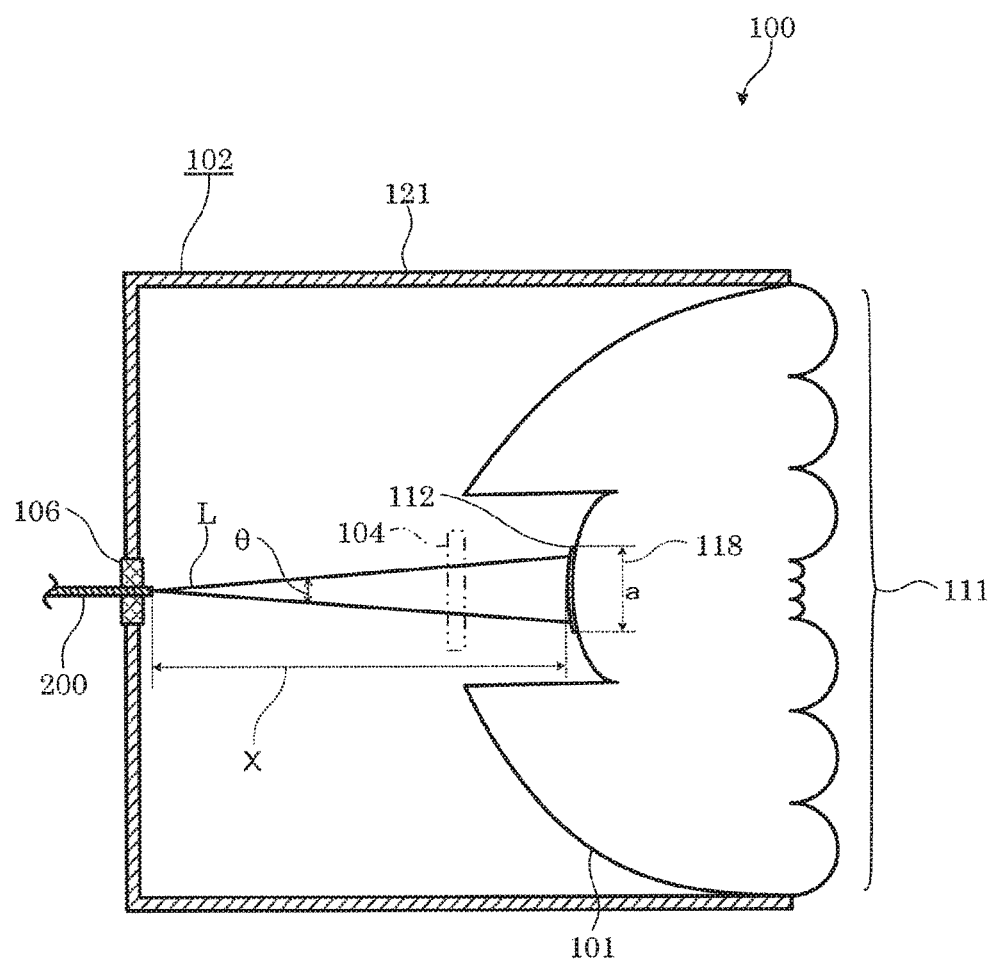
FIG. 14 is a cross-sectional view of a lighting apparatus according to another embodiment.

Dispersion region 118 needs to be sized and positioned to include the region of lens 101 that is irradiated with the laser light, in the case where light-emitting component 104 falls off from case 102. For example, as illustrated in FIG. 14, the size of dispersion region 118 needs to satisfy $a \geq X \cdot \tan \theta$, where a denotes the diameter of dispersion region 118, X denotes the distance from the light exit end of optical fiber 200 to dispersion region 118 in the case where optical system 105 is not present, and $\theta$ denotes the angle of divergence of light exiting from the light exit end of optical fiber 200.

It should be noted that, when optical system 105 is included as in this embodiment, the aforementioned expression need not be satisfied, and, in the case where light-emitting component 104 is not present, it is sufficient that dispersion region 118 be set to cover the entirety of the laser light reaching light-dispersing structure 112.

As illustrated in FIG. 1 and FIG. 2, case 102 is a box-shaped structural component that houses light-emitting component 104 and optical system 105, with lens 101 being attached to one end and fiber attachment component 106 being attached on the other end. In this embodiment, case 102 includes a cylindrical outer shell portion 121 and inner shell portion 122 which holds light-emitting component 104 and reflects light radiated from light-emitting component 104 to the direction of lens 101.

Furthermore, case 102 is a component that covers the optical path of laser light L. In this embodiment, a component or structure which absorbs laser light L is provided on the inner circumferential surface of case 102 (illustration omitted).

Here, a component that absorbs laser light is, for example, a component which includes a pigment that absorbs blue color when the laser light is blue. Furthermore, a structure that absorbs laser light is a structure, etc., that causes irregular reflection and quenching of laser light by providing fine irregularities on the inner circumferential surface. Accordingly, the safety of lighting apparatus 100 can be maintained at a high state even when optical axis A of laser light L shifts unintentionally.

Optical system 105 is a set of lenses which are set to condense incident laser light L onto light-emitting component 104.

It should be noted that the type of optical system 105 is selected as appropriate in accordance with the intended use of lighting apparatus 100, and there are instances when lighting apparatus 100 does not include optical system 105.

Fiber attachment component 106 is a component for attaching optical fiber 200 to case 102 in such a way that optical fiber 200 is aligned with a predetermined optical axis. Optical fiber 200 transmits the laser light emitted from light source apparatus 202 (see FIG. 10) which is a separate body from lighting apparatus 100. Fiber attachment component 106 enables optical fiber 200 to be attached in such a way that optical axis A of laser light L passes through dispersion region 118.

[Mode of Use of Lighting Apparatus]

Next, the mode of use of lighting apparatus 100 having the above described configuration will be specifically described.

Figure 10:
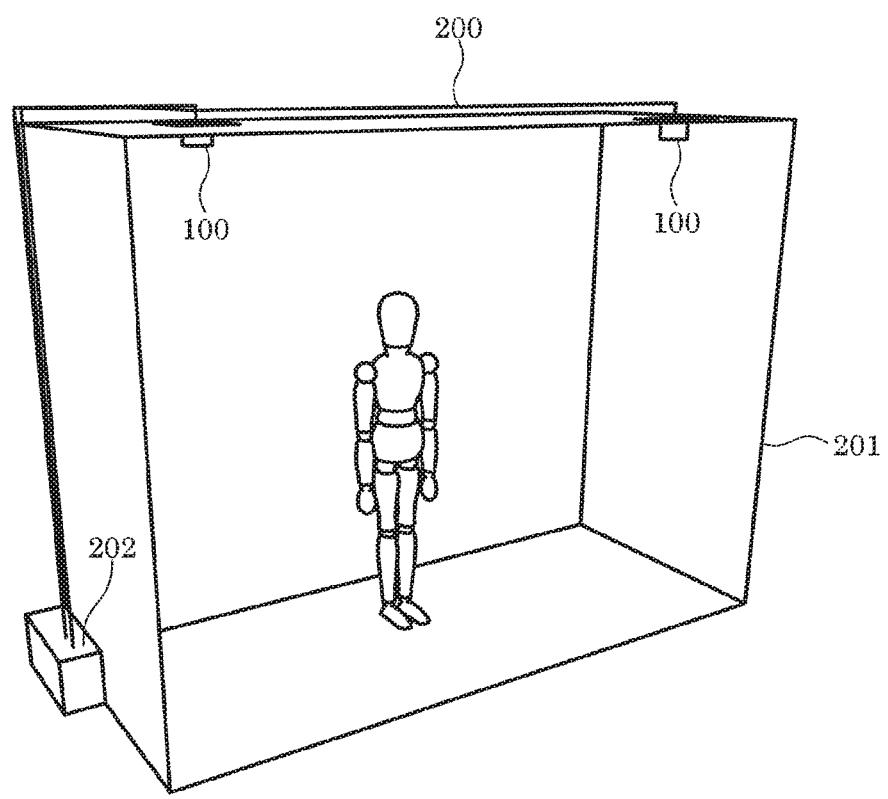
FIG. 10 is a diagram schematically illustrating a mode of use of a lighting apparatus.

In this embodiment, as illustrated in FIG. 10, lighting apparatus 100 is used as an apparatus that is attached to the ceiling, etc., of building 201, for illuminating a room. Furthermore, light source apparatus 202 is provided outside building 201, and the laser light emitted from light source apparatus 202 is transmitted to lighting apparatus 100 by optical fiber 200 which is laid out outside building 201.

Light source apparatus 202 is an apparatus that generates laser light and supplies the laser light to a plurality of lighting apparatuses 100 by using optical fiber 200. Specifically, for example, light source apparatus 202 includes a plurality of semiconductor laser elements which emit laser light of a wavelength selected from a blue-violet to blue (430 nm to 490 nm) range. In this manner, disposing the semiconductor laser elements in one place enables the cooling devices that cool the semiconductor laser elements to be centralized, and thus cooling efficiency can be enhanced and the waste heat can be utilized for water heating, etc.

The laser light emitted from light source apparatus 202 is transmitted via optical fiber 200, and laser light L radiated from the attached end of optical fiber 200 is introduced inside lighting apparatus 100, as illustrated in FIG. 2.

Then, laser light L that has passed through optical system 105 passes the air inside case 102 and is irradiated to light-emitting component 104.

In light-emitting component 104, fluorescence in a plurality of wavelengths is generated by different types of phosphors, with the irradiated laser light as excitation light, and light which can be seen as white overall is emitted toward the outside of lighting apparatus 100.

In the regular mode of use, the light emitted from lighting apparatus 100 undergoes the desired light distribution control by light distribution controlling structure 111, and is, for example, controlled to become parallel light. Here, although light-dispersing structure 112 is present in the center portion of light distribution controlling structure 111, the impact of light-dispersing structure 112 on the light radiated from light-emitting component 104 is small, and the impact of light-dispersing structure 112 on visible light V emitted from lighting apparatus 100 is negligible.

Figure 5:
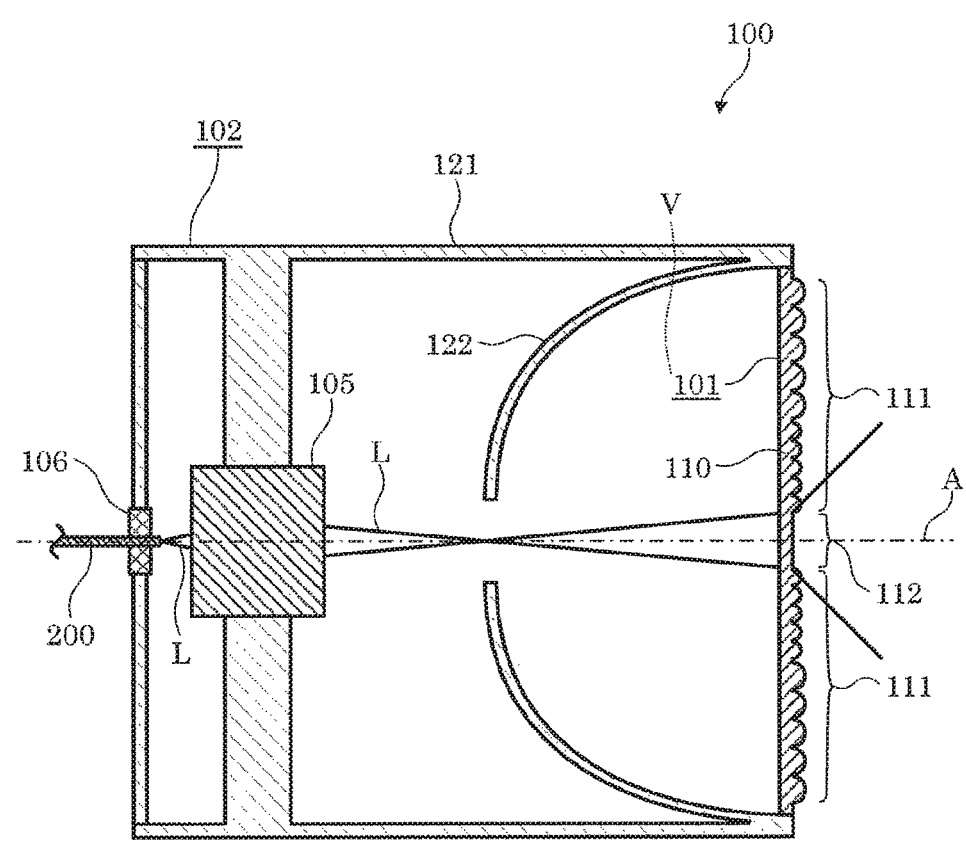
FIG. 5 is a cross-sectional view illustrating a state in which a light-emitting component has fallen off from the lighting apparatus according to the embodiment.

Next, even if light-emitting component 104 cracks or falls off from inner shell portion 122 when shock is unintentionally imparted to lighting apparatus 100 or due to deterioration over time, and causes laser light L to directly reach lens 101, as illustrated in FIG. 5, light-dispersing structure 112 diffracts and disperses laser light L, and thus the impact that laser light L has on human eyes can be reduced even when a person looks into lighting apparatus 100.

Advantageous Effects

According to above-described lighting apparatus 100, even when the laser light does not pass through light-emitting component 104 and directly reaches lens 101, because light-dispersing structure 112 is provided along and in the surroundings of the optical axis of the laser light, it is possible to prevent coherent laser light from being emitted to the outside of lighting apparatus 100, and thus the safety of lighting apparatus 100 can be improved.

Furthermore, since light-dispersing structure 112 is integrally provided in lens 101 which is the largest component among the component disposed along the optical axis of the laser light, lens 101 can be rigidly fixed to case 102, that is, light-dispersing structure 112 can be rigidly fixed to case 102 via lens 101, and thus the possibility that light-dispersing structure 112 will fall off from case 102 can be reduced.

Furthermore, since lens 101 is disposed at a position that is easily noticeable from the outside of lighting apparatus 100, the user can quickly notice and react in the case where lens 101 falls off from case 102 or lens 101 becomes chipped or cracked. Therefore, it is possible to quickly distinguish when light-dispersing structure 112 has fallen off from the optical axis of the laser light, and thus prevent both light-emitting component 104 and light-dispersing structure 112 from falling off case 102.

In addition, since lighting apparatus 100 in this embodiment uses laser light that is transmitted from external light source apparatus 202 and does not include a light source, a cooling apparatus for cooling a semiconductor laser element is not need in lighting apparatus 100 itself and power need not be supplied to lighting apparatus 100. Therefore, lighting apparatus 100 can be made small and lightweight, and thus an inexpensive lighting apparatus can be realized.

Other Embodiments

Although lighting apparatus 100 according to the present disclosure is described based on the foregoing exemplary embodiment, the present disclosure is not limited to the exemplary embodiment.

Figure 6:
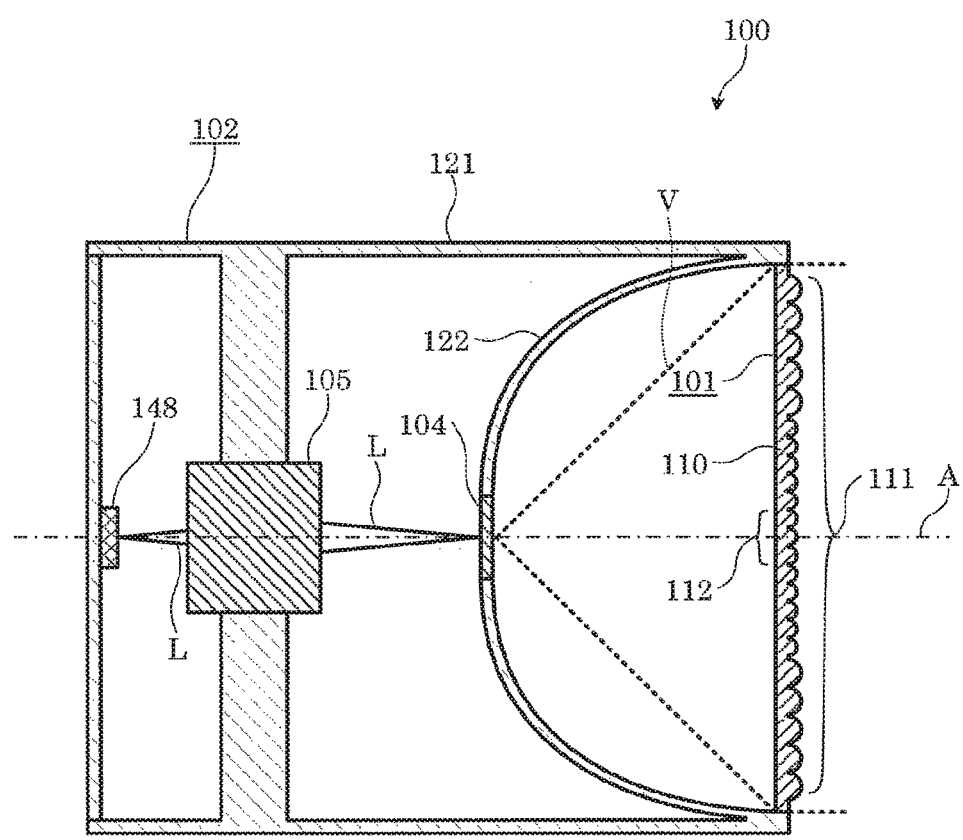
FIG. 6 is a cross-sectional view of a lighting apparatus according to another embodiment.

Although light source apparatus 202 including semiconductor laser elements is provided outside of lighting apparatus 100, and laser light is introduced inside lighting apparatus 100 via optical fiber 200 in the foregoing embodiment, lighting apparatus 100 is not limited to this form. For example, as illustrated in FIG. 6, lighting apparatus 100 may include, at an end of case 102, semiconductor laser element 148 capable of emitting laser light along optical axis A.

Furthermore, light distribution controlling structure 111 may be included on one face of lens 101, and light-dispersing structure 112 may be included on the other face. Furthermore, as illustrated in FIG. 6, light-dispersing structure 112 and light distribution controlling structure 111 may be disposed aligned along optical axis A of laser light L. Accordingly, light distribution control of visible light V can be performed easily while maintaining the safety of lighting apparatus 100.

Figure 7:
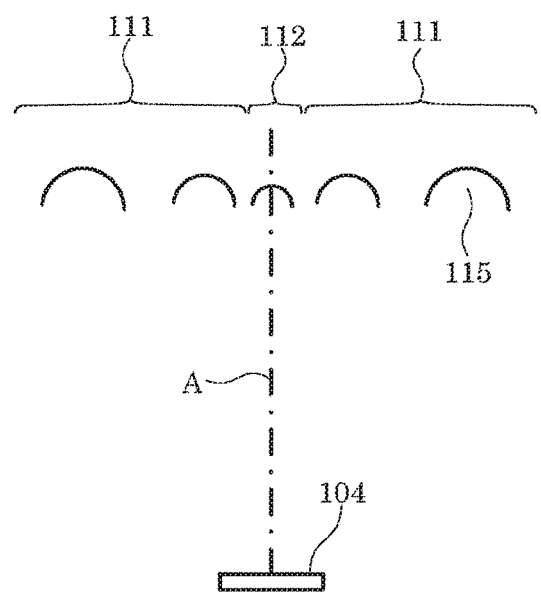
FIG. 7 is a diagram schematically illustrating an area distribution for structural units of the light distribution controlling structure.
Figure 7:
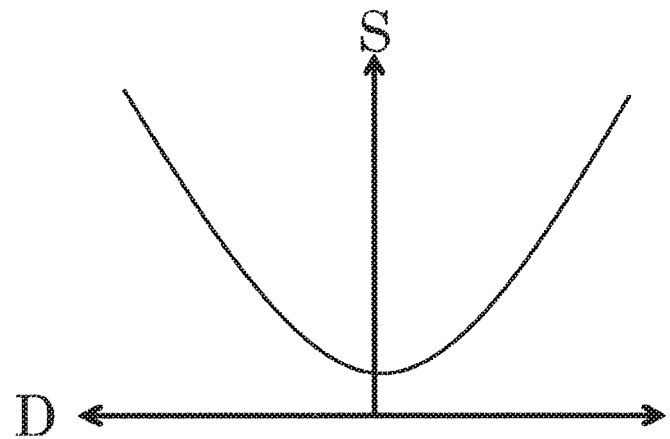

Furthermore, although the area of structural units 115 provided in lens 101 is described as changing in stages as the distance from optical axis A increases, area S of structural units 115 may change continuously with distance D from optical axis A, as illustrated in FIG. 7. Furthermore, the changing in stages and the continuous change may be combined.

Furthermore, refracting region 116 and dispersing region 118 may partially overlap. Specifically, a plurality of the structural units of light-dispersing structure 112 may be disposed on the surface of the structural units of light distribution controlling structure 111.

Furthermore, although structural units 115 are arranged evenly on the surface of boar-shaped base portion 110, structural units 115 may be randomly arranged.

Figure 8:
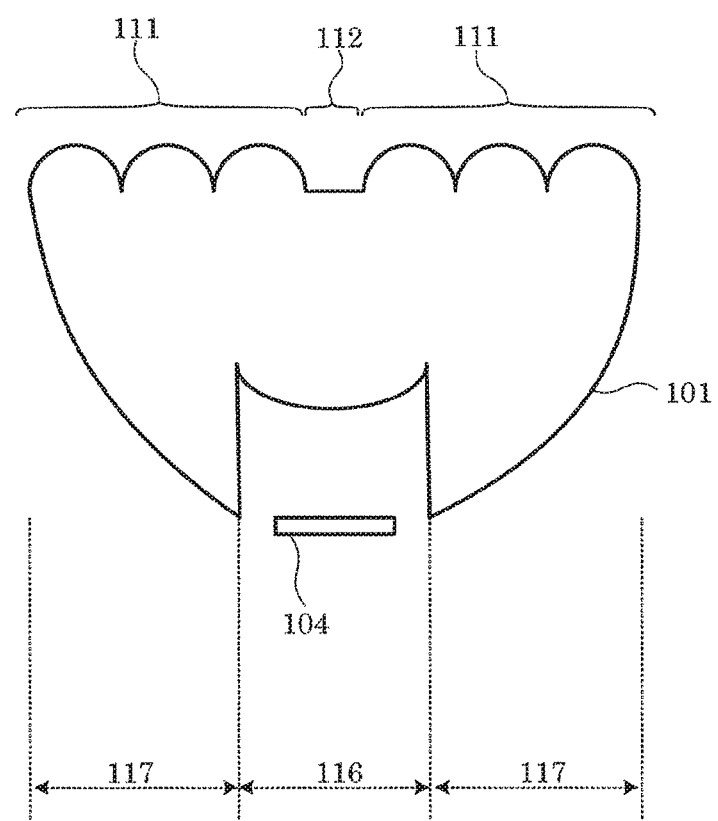
FIG. 8 is a diagram illustrating the shape of a lens according to another embodiment.
Figure 9:
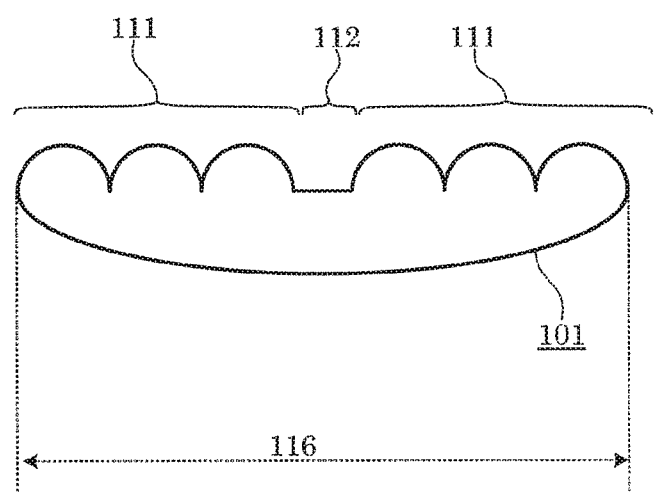
FIG. 9 is a diagram illustrating the shape of a lens according to another embodiment.

Furthermore, the shape of lens 101 need not always be that of structural units provided on a flat board, and may be set randomly based on the desired light distribution such as those illustrated in FIG. 8 and FIG. 9.

Figure 11:
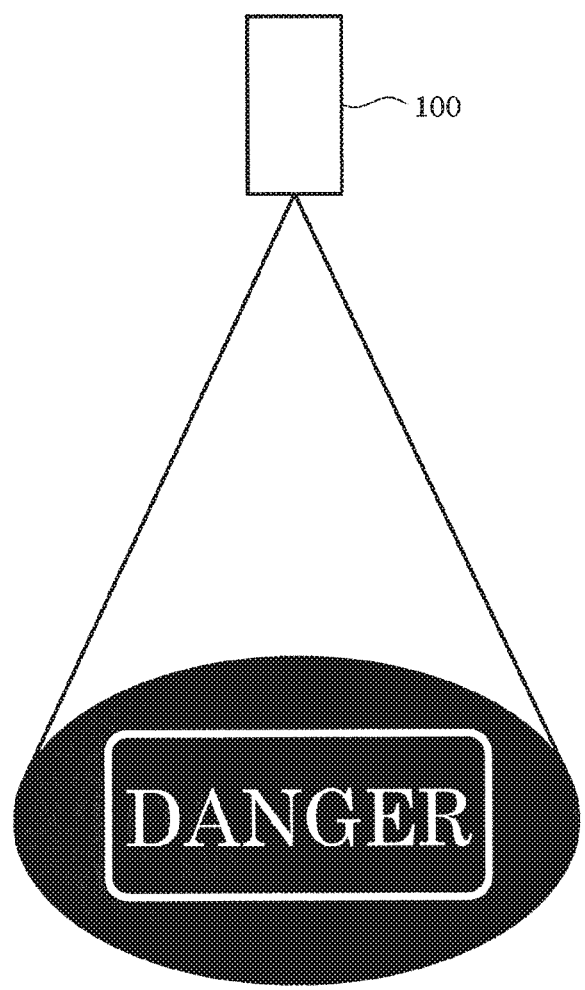
FIG. 11 is a diagram illustrating an illumination pattern according to a special forming shape in a light-dispersing structure.

Furthermore, as illustrated in FIG. 11, a structure which enables a desired message pattern or figure to be emitted onto the floor, etc., when the laser light passes through light-dispersing structure 112 may be incorporated in light-dispersing structure 112. Specifically, this can be implemented by placing a forming shape of fine diffraction grating on a portion of light-dispersing structure 112. Accordingly, since the falling or cracking, etc. of light-emitting component 104 can be visually communicated, a situation in which a person looks directly into the laser light can be avoided, thus further improving the safety of lighting apparatus 100.

Figure 12:
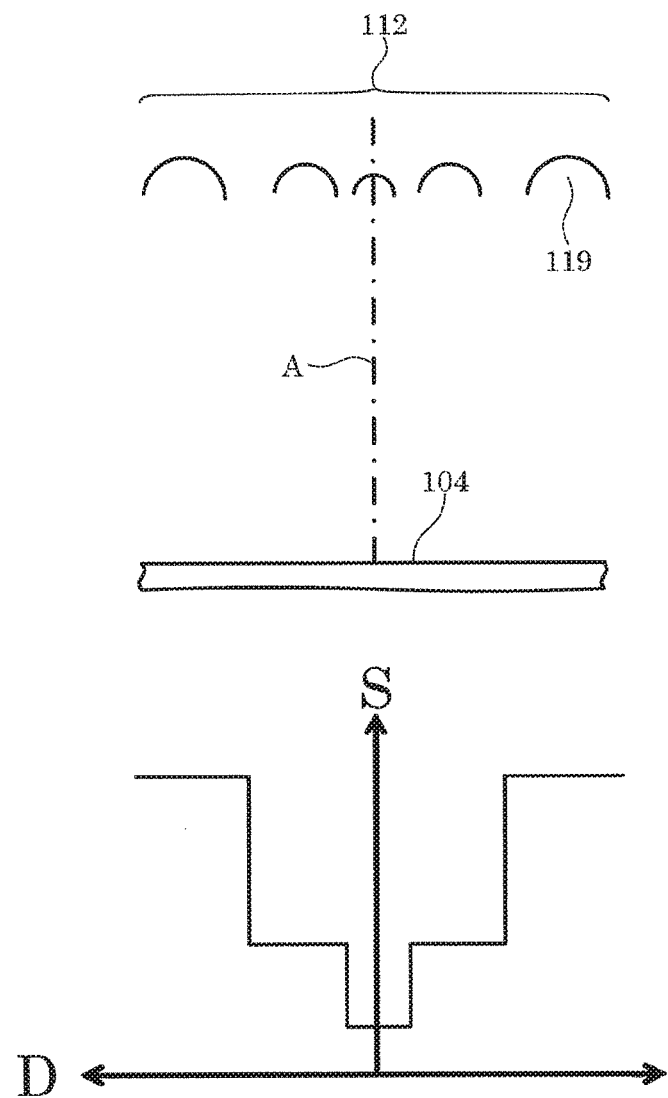
FIG. 12 is a diagram schematically illustrating an area distribution for structural units of a light-dispersing structure.

Furthermore, as illustrated in FIG. 12, light-dispersing structure 112 may be a structure in which the area S of structural units 119 of light-dispersing structure 112 provided in lens 101 becomes smaller in stages with the proximity to optical axis A.

Figure 13:
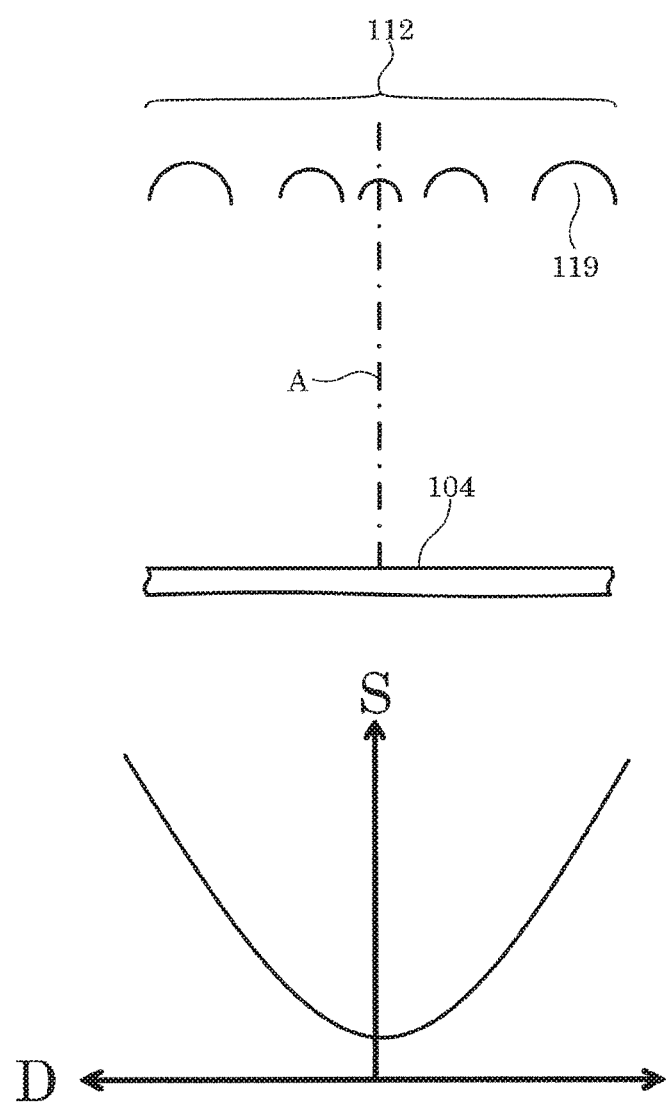
FIG. 13 is a diagram schematically illustrating an area distribution for structural units of a light-dispersing structure.

Furthermore, as illustrated in FIG. 13, light-dispersing structure 112 may be a structure in which the area S of structural units 119 of light-dispersing structure 112 provided in lens 101 becomes smaller continuously with the proximity to optical axis A.

Furthermore, aside from including light distribution controlling structure 111 and light-dispersing structure 112 on one face of lens 101 as in the foregoing embodiment, light distribution controlling structure 111 may be included on one face of lens 101, and light-dispersing structure 112 may be included on the other face.

Forms obtained by various modifications to the exemplary embodiments that can be conceived by a person of skill in the art as well as forms realized by arbitrarily combining structural components and functions in the respective exemplary embodiments which are within the scope of the essence of the present disclosure are included in the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus which radiates visible light, with laser light as a light source, the laser light having a wavelength shorter than a wavelength of the visible light, the lighting apparatus comprising:
   a light-emitter which, when irradiated with the laser light, radiates the visible light having the wavelength different from the wavelength of the laser light; and
   a lens integrally including a light distribution controlling structure, the light distribution controlling structure including first structures that control distribution of the visible light radiated from the light-emitter, the lens being disposed opposite a laser light entry side of the lighting apparatus, the light-emitter being disposed between the lens and the laser light entry side,
   wherein the lens integrally includes, in a region through which an optical axis of the laser light passes, a light-dispersing structure including third structures having at least one of a convex shape and a concave shape, the third structures configured to disperse the laser light having the wavelength shorter than the wavelength of the visible light, and
   a distance between adjacent third structures among the third structures of the light-dispersing structure is at most equal to 1/100th of a distance between adjacent first structures among the first structures of the light distribution controlling structure, and is at least 1 micron and at most 100 microns on average.

2. The lighting apparatus according to claim 1, wherein the lens includes the light distribution controlling structure and the light-dispersing structure on a single face.

3. The lighting apparatus according to claim 2, wherein the light distribution controlling structure and the light-dispersing structure partially overlap on the single face.

4. The lighting apparatus according to claim 3, a plurality of the third structures of the light-dispersing structure is disposed on surfaces of the first structures of the light distribution controlling structure in a region in which the light distribution controlling structure and the light-dispersing structure partially overlap.

5. The lighting apparatus according to claim 1, wherein the lens includes the light distribution controlling structure on a first face and includes the light-dispersing structure on a second face.

6. The lighting apparatus according to claim 1, wherein the light-dispersing structure includes a diffraction grating corresponding to the laser light.

7. The lighting apparatus according to claim 1, wherein the third structures are non-periodically arranged.

8. The lighting apparatus according to claim 1, wherein the light-dispersing structure includes a structure configured to cause light to be emitted in a predetermined pattern when the laser light passes through the light-dispersing structure.

9. The lighting apparatus according to claim 1, wherein the light-dispersing structure comprises a fine diffraction grating configured to emit a predetermined message, pattern, or figure on a surface when the laser light passes through the light-dispersing structure.

10. The lighting apparatus according to claim 1, wherein the third structures of the light-dispersing structure become smaller in stages with proximity to the region through which the optical axis of the laser light passes.

11. The lighting apparatus according to claim 1, wherein the third structures of the light-dispersing structure become smaller continuously with proximity to the region through which the optical axis of the laser light passes.

12. The lighting apparatus according to claim 1, wherein a size of the light-dispersing structure satisfies:

$$a \geq X \cdot \tan \theta,$$

where a is a diameter of the light-dispersing structure,
X is a distance from a light exit end of the light source, and
θ is an angle of divergence of the laser light exiting from the light exit end of the light source.

13. The lighting apparatus according to claim 1, further comprising:
   a case in which the light-emitter is disposed, the lens being rigidly fixed to the case,
   wherein the light-dispersing structure is rigidly fixed to the case via the lens.

14. The lighting apparatus according to claim 1, wherein the light-emitter includes particles of at least one type in a resin or base material, the particles generating fluorescence when excited by the laser light.

15. The lighting apparatus according to claim 1, further comprising:
   a case in which the light-emitter is disposed, the lens being rigidly fixed to the case;
   a laser element provided externally of the case, the laser element emitting the laser light; and
   a fiber extending from the laser element to the laser light entry side of the lighting apparatus for providing the laser light from the laser element to the light-emitter.

* * * * *